US009477256B2

(12) United States Patent
Sima

(10) Patent No.: US 9,477,256 B2
(45) Date of Patent: Oct. 25, 2016

(54) ELECTRONIC CIRCUIT WITH A SLEEP MODE AND A BYPASS CONNECTION FOR CONVEYING A SLOW CLOCK SIGNAL

(71) Applicant: EM MICROELECTRONIC-MARIN SA, Marin (CH)

(72) Inventor: Ovidiu Sima, Zurich (CH)

(73) Assignee: EM MICROELECTRONIC-MARIN SA, Marin (CH)

( * ) Notice: Subject to any disclaimer, the term of this patent is extended or adjusted under 35 U.S.C. 154(b) by 104 days.

(21) Appl. No.: 14/509,773

(22) Filed: Oct. 8, 2014

(65) Prior Publication Data
US 2015/0121110 A1 Apr. 30, 2015

(30) Foreign Application Priority Data

Oct. 30, 2013 (EP) ..................................... 13190907

(51) Int. Cl.
*G06F 1/32* (2006.01)
*G06F 1/00* (2006.01)
*G06F 1/04* (2006.01)

(52) U.S. Cl.
CPC ................. *G06F 1/04* (2013.01); *G06F 1/324* (2013.01); *Y02B 60/1217* (2013.01)

(58) Field of Classification Search
CPC .................................................... G06F 1/3203
USPC ........................................................ 713/320
See application file for complete search history.

(56) References Cited

U.S. PATENT DOCUMENTS

| 5,982,210 | A  | * | 11/1999 | Rogers .......................... | 327/156 |
| 7,036,032 | B2 | * | 4/2006  | Mizuyabu et al. ........... | 713/323 |
| 7,849,339 | B2 | * | 12/2010 | Lee ................ | 713/322 |
| 2005/0242851 | A1 | * | 11/2005 | Booth et al. .................. | 327/156 |
| 2008/0235526 | A1 |   | 9/2008  | Lee |  |
| 2009/0289889 | A1 | * | 11/2009 | Dove et al. ................... | 345/102 |

FOREIGN PATENT DOCUMENTS

| JP | 05 303444 A | 11/1993 |
| JP | 08 286780 A | 11/1996 |
| JP | 10 94019 A | 4/1998 |

OTHER PUBLICATIONS

European Search Report for corresponding EP 13 19 0907 dated Feb. 19, 2014.

* cited by examiner

*Primary Examiner* — Suresh Suryawanshi
(74) *Attorney, Agent, or Firm* — Sughrue Mion, PLLC

(57) ABSTRACT

The present invention concerns an electronic circuit comprising a control signal processing circuit with a control signal input and a control signal output circuit, the processing circuit being arranged to process a control signal applied to the control signal input, and to operate in at least one of a first power mode and a second power mode, the second power mode having a lower power consumption than the first power mode. The electronic circuit further comprises a control signal processing circuit bypass means for providing, when the processing circuit is in the second power mode, a bypass connection for conveying the control signal from the control signal input to the control signal output circuit, thereby bypassing the processing circuit.

11 Claims, 2 Drawing Sheets

ELECTRONIC CIRCUIT WITH A SLEEP MODE AND A BYPASS CONNECTION FOR CONVEYING A SLOW CLOCK SIGNAL

TECHNICAL FIELD

This application claims priority from European Patent Application No. 13190907.9 filed Oct. 10, 2013, the entire disclosure of which is incorporated herein by reference.

The present invention relates to the field of electronic circuits for processing control signals and, in particular, to such circuits having a low power sleep mode. The invention also relates to a method of operating such an electronic circuit.

BACKGROUND OF THE INVENTION

An electronic circuit may comprise a processing circuit for processing one or more control signals. The control signals may be for example different clock signals. One clock can be a slow clock and another clock can be a fast clock. If the control signal processing circuit is a clock processing circuit, it may include functions related to clock selection, synchronization, timing signal generation and frequency division. This kind of circuit, with a central processing unit (CPU) and peripherals, may be for example used for watch applications, where the slow clock may be used for timing reference, whereas the fast clock may be used to clock peripheral components of the watch.

Many electronic circuits can operate at least in a first power mode, e.g. a high power mode, and in a second power mode, such as a reduced power mode in order to reduce energy consumption. For instance, the reduced power mode may be used when the processing circuit processes a slow frequency clock signal, whereas the circuit may operate in a high power mode when the processing circuit processes a fast clock signal. In electronic circuits which are known in the prior art, some of the components of the control signal processing circuit have a reduced power mode, but certain components cannot be put into a sleep mode, in which the dynamic power consumption would be zero, because they generate signals which are essential to the functioning of the device in which they are present. This is disadvantageous, because the power consumption in this case cannot be reduced to a minimum. For instance, in the case of a prior art clock signal processing circuit, a clock source selection unit and frequency dividers cannot be put into a sleep mode, in which the dynamic power consumption of these elements would be zero, because the clock signals are essential to the functioning of the device in which they are used.

SUMMARY OF THE INVENTION

It is therefore an object of the present invention to overcome the problem identified above related to the power consumption in an electronic circuit.

According to a first aspect of the invention, there is provided an electronic circuit, comprising:
- a control signal processing circuit with a control signal input circuit and a control signal output circuit, the processing circuit being arranged to process a control signal, such as a fast clock signal or a slow clock signal, applied to from the control signal input circuit, and to operate in at least one of a first power mode and a second power mode, the second power mode having a lower power consumption than the first power mode, wherein the electronic circuit includes:
- control signal processing circuit bypass means for providing, when the processing circuit is in the second power mode, a bypass connection for conveying the control signal, such as a slow clock signal, from the control signal input circuit to the control signal output circuit, thereby bypassing the processing circuit, and
- a signal selector between the control signal input circuit and a control signal selection unit of the processing circuit, a first input signal of the signal selector having an electric potential of zero, whereas a second input signal is the control signal from the control signal input circuit, said signal selector being controlled by a signal selection control signal and when in the second power mode, the signal selection control signal being arranged to select the signal with electric potential of zero to be fed to the control signal selection unit.

Other aspects of the present invention are recited in the dependent claims 2-7.

An advantage of the electronic circuit of the present invention lies in the fact that the dynamic power consumption in the reduced power mode is minimal. The dynamic power consumption of at least some components of the control signal processing circuit can be reduced to zero and thus the control signal processing circuit can be put in a sleep mode. All or some components of the processing circuit can be completely powered down. By the proposed solution, the overall power consumption of the whole system, i.e. the electronic circuit can be reduced.

According to a second aspect of the invention, there is provided a method of operating an electronic circuit comprising a control signal processing circuit with a control signal input circuit and a control signal output circuit, the processing circuit being arranged to process a control signal, such as a fast clock signal or a slow clock signal, applied from the control signal input circuit, and to operate in at least one of a first power mode and a second power mode, the second power mode having a lower power consumption than the first power mode, wherein the electronic circuit further comprises a signal selector between the control signal input circuit and a control signal selection unit of the processing circuit, a first input signal of the signal selector having an electric potential of zero, whereas a second input signal is the control signal from the control signal input circuit, said signal selector being controlled by a signal selection control signal,
the method comprising:
receiving a request to enter the second power mode,
wherein the method comprises:
in response to the request to enter the second power mode, conveying the control signal, such as a slow clock signal, from the control signal input circuit to the control signal output circuit through a control signal processing circuit bypass means, thereby bypassing the processing circuit, and
when in the second power mode, the signal selection control signal being arranged to select the signal with electric potential of zero to be fed to the control signal selection unit.

Particular steps of the method of operating the electronic circuit are defined in the dependent claims 9 to 11.

BRIEF DESCRIPTION OF THE DRAWINGS

Other features and advantages of the invention will become apparent from the following description of non-limiting exemplary embodiments, with reference to the appended drawings, in which.

DETAILED DESCRIPTION OF EMBODIMENTS OF THE INVENTION

Figure 1:
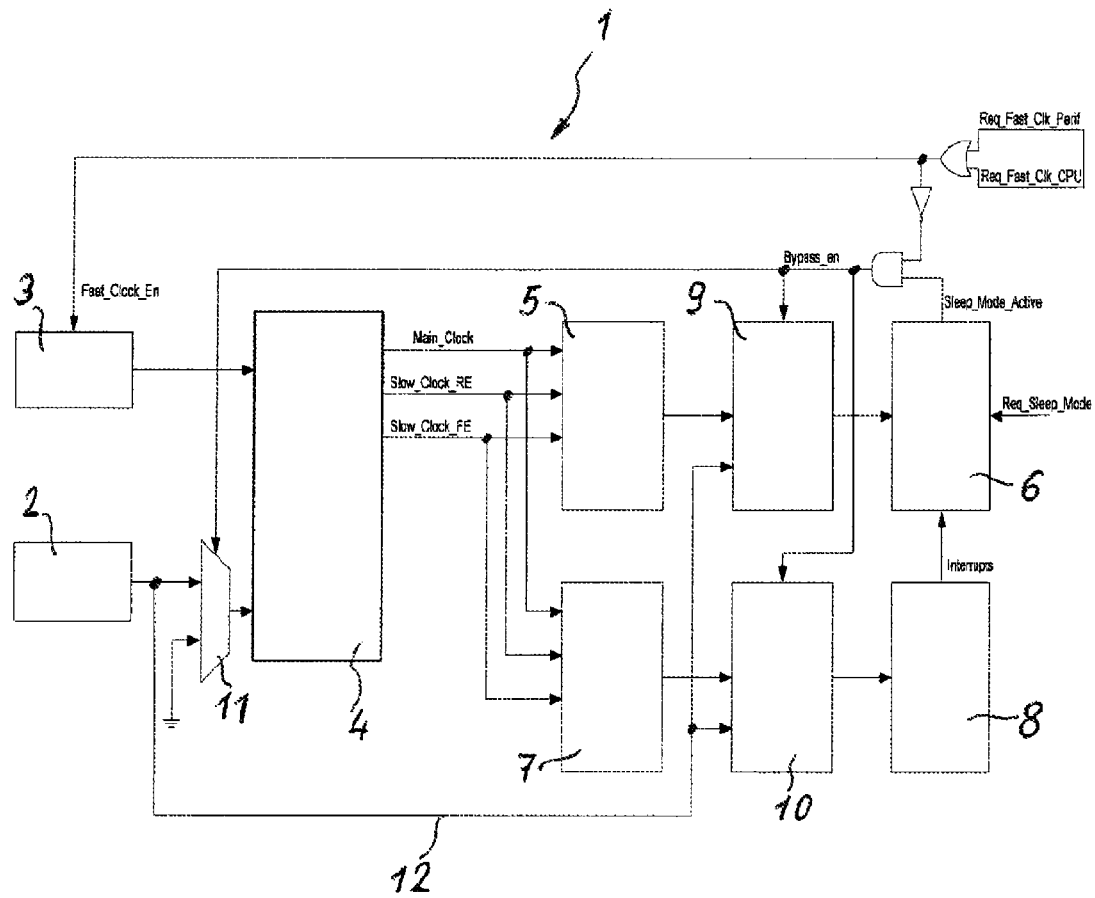
FIG. 1 is a block diagram of an exemplary electronic circuit according to an embodiment of the present invention.

An embodiment of the present invention will be described in the following in more detail with reference to the attached figures. Identical functional and structural elements which appear in the different drawings are assigned the same reference numerals.

FIG. 1 shows a block diagram of an exemplary electronic circuit 1 according to the illustrated embodiment. The illustrated circuit can be used for instance in watch applications. The electronic circuit 1 includes a slow clock source 2, in this example a first oscillator between 1 kHz and 1 MHz frequency, but preferably at 32 kHz frequency, and a fast clock source 3, which is a second oscillator, for example a resistor-capacitor (RC) oscillator, in this example at frequency more than 5 MHz. The slow clock source 2 continuously produces a slow clock signal, while the fast clock source 3 produces a fast clock signal only when a fast clock control signal referred to as Fast_Clock_En in FIG. 1 is enabled.

The electronic circuit 1 further includes a control signal selector, in this example a clock selection and synchronizer unit 4 arranged to receive the two clock signals in order to select and output one clock signal, a so called main clock signal. The clock signal is fed to a first clock signal generator, in this example called a first clock generator and divider unit 5, and to a second clock signal generator, in this example called a second clock generator and divider unit 7. The first clock generator and divider unit 5 is arranged to generate a timing signal for a CPU 6, whereas the second clock generator and divider unit 7 is arranged to generate a timing signal for peripherals 8. In FIG. 1 there are also shown two more outputs from the clock selection and synchronizer unit 4, namely Slow_Clock_RE (slow clock rising edge) and Slow_Clock_FE (slow clock falling edge), which are needed for the timing when the fast clock is chosen as the main clock.

The first and second clock generator and divider units 5, 7 are arranged to generate, starting from the input main clock signal, another signal that is output to a corresponding switch, referred to here a bypass switch 9, 10, as illustrated in FIG. 1. The output signal is obtained by dividing the input signal with a positive integer based on the requirements of the CPU 6 and/or the peripherals 8. As shown, there is one bypass switch 9 for the CPU 6 and another bypass switch 10 for the peripherals 8. The peripherals in the described watch application may be different types of sensors, such as temperature or pressure sensors, a timing unit, different interfaces, such as a serial port interface (SPI) or inter-integrated circuit (I²C) interface, motor drivers, etc.

The electronic circuit 1 also comprises a signal selector or multiplexer 11 between the slow clock source 2 and the clock selection and synchronizer unit 4. One of the multiplexer inputs is grounded, while another input comes from the slow clock source 2. The output signal of the multiplexer is selected from the two input signals based on a control signal called Bypass_en in FIG. 1. The two bypass switches 9, 10 are between the first and second clock generator and divider units 5, 7 and the CPU 6 and peripherals 8. As shown in FIG. 1, the Bypass_en control signal is also fed to the bypass switches 9, 10 so that, when this signal is enabled, the bypassed slow clock signal from the slow clock source 2 is selected to be fed to the CPU 6 and peripherals 8, as will be explained later in more detail. If however, the Bypass_en is not enabled, then the input coming from the respective clock generator and divider unit 5, 7 is selected by the bypass switch 9, 10.

The electronic circuit 1, or more specifically the clock processing circuit in this example comprising the clock selection and synchronizer unit 4, the two clock generator and divider units 5, 7 and the signal selector 11, has three dynamic power consumption modes, namely a high power mode, a low power mode and a sleep mode.

During the selection of the sleep mode activated by a control signal labeled Req_Sleep_Mode in FIG. 1, the fast clock is not running, and the signal selector 11 is controlled by the Bypass_en signal so that, as a result, the input of the clock selection and synchronizer unit 4 is connected to ground. The two bypass switches 9, 10 are also controlled by the Bypass_en signal so that, when this signal is enabled, only the raw slow clock signal from the slow clock source 2 is fed to the CPU 6 and peripherals 8. This means that there the inputs of the clock selection and synchronizer unit 4 are not active, and consequently the dynamic power consumption of the clock selection and synchronizer unit 4, the first clock generator and divider unit 5 and the second clock generator and divider unit 7 is zero in the sleep mode. Thanks to the bypass signal line 12 between the slow clock source 2 and the bypass switches 9, 10, these switches still receive the slow clock signal, which is further fed to the CPU 6 and peripherals 8. It is to be noted that in the sleep mode, the static power consumption (i.e. the power consumed while there is no circuit activity) of the clock processing circuit may or may not be zero. This depends on the actual implementation details.

As shown in FIG. 1, it can be further provided a gate OR to receive two request signals from peripherals 8 and CPU 6 labeled Req_Fast_Clk_Perif and Req_Fast_Clk_CPU in order to enable the fast clock source 3, and an inverter connected to the output of the gate OR to enter at input of a gate AND receiving at a second input a sleep signal from the CPU labeled Sleep_Mode_Active. When the sleep mode is activated by a control signal labeled Req_Sleep_Mode, the sleep signal and the output from the inverter are in a high state in order to provide the Bypass_en in the sleep mode.

In the high power consumption mode the fast clock source is enabled and the fast clock signal is chosen as the main clock signal coming out from the clock selection and synchronizer unit 4. On the other hand, in the low power mode, the main clock is the slow clock signal from the slow clock source 2. It is to be noted that that the raw slow clock signal from the slow clock source 2 is in all modes continuously fed to the bypass switches 9, 10.

In the circuit of FIG. 1, when the fast clock source 3 is used, the slow clock needs to be regenerated synchronized with the fast clock. The CPU 6 and peripherals 8 can request different clock speeds at the same time.

Figure 2:
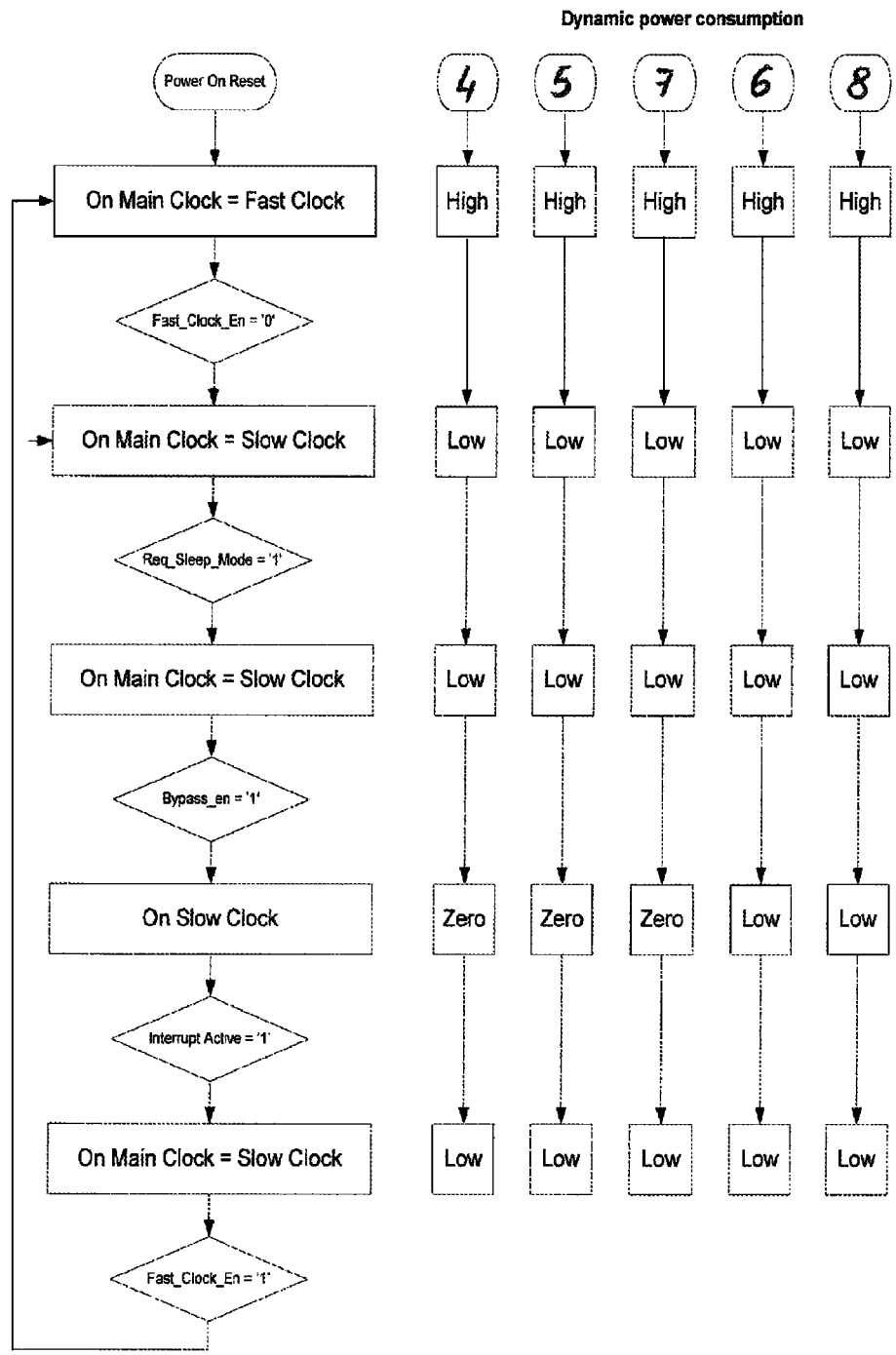
FIG. 2 is a flow chart illustrating the power consumption of some elements in FIG. 1 at different time instants.

FIG. 2 shows the dynamic power consumption of the clock selection and synchronizer 4, the two clock generator and divider units 5, 7, the CPU 6 and the peripherals 8 when the system is in different states. The system is normally in the sleep mode and wakes up at given intervals, for instance once a second, to turn the watch motor for the second-hand by one step. Once the Bypass_en signal is high, all the logic that is needed in order to support the two different clock sources and different clock speeds is disabled. The slow clock signal is fed through the bypass circuit 12 from the processing circuit input to the bypass switches 9, 10, which can be considered to be part of a clock signal output circuit. The dynamic power consumption for the blocks belonging to the clock signal processing circuit, apart from the signal selector 11, is reduced to zero because there is no toggle activity at the inputs and thus the circuit 1 is said to be in the sleep mode. When the energy consumption of these components is low, then the circuit is said to be in the low power mode, whereas when the energy consumption of these components is high, then the circuit 1 is said to be in the high power mode.

It is to be noted that the implementation described is given by way of example only in a circuit that can be used for watch applications, where the slow clock is typically used for timing reference and the fast clock typically to access the peripherals. However, the teachings of the present invention can be generalized for instance by taking any electronic circuit having a control signal processing circuit controlled by a control signal. Thus, instead of the clock signals described above, there can simply be a control signal that in the sleep mode of the electronic circuit is arranged to bypass the control signal processing circuit so that the energy consumption of at least some of the components of the control signal processing circuit can be minimized or cut to zero.

Also, in some implementations the bypass switches 9, 10 are not needed. Instead of these bypass switches, the bypass line 12 could be connected to the output line of the clock generator units 5, 7. In this case the bypass circuit could have a switch for disabling/enabling the control signal fed to the clock generator output. Also the clock generator outputs could have a switch each. In this way, by use of these different switches, the desired signal could be selected to be fed to the CPU 6 and peripherals 8.

While the invention has been illustrated and described in detail in the drawings and foregoing description, such illustration and description are to be considered illustrative or exemplary and not restrictive, the invention being not limited to the disclosed embodiment. Other embodiments and variants are understood, and can be achieved by those skilled in the art when carrying out the claimed invention, based on a study of the drawings, the disclosure and the appended claims.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used. Any reference signs in the claims should not be construed as limiting the scope of the invention.

What is claimed is:

1. An electronic circuit comprising:
    a control signal input circuit including a slow clock source configured to generate a slow clock signal and fast clock source configured to selectively generate a fast clock signal;
    a control signal output circuit; and
    a control signal processing circuit configured to process at least one of the slow clock signal and the fast clock signal, applied from the control signal input circuit, and to operate in at least one of a first power mode and a second power mode, the second power mode having a lower power consumption than the first power mode;
    a control signal processing bypass circuit configured to, when the control signal processing circuit is in the second power mode, provide a bypass connection for conveying the slow clock signal, from the control signal input circuit to the control signal output circuit, thereby bypassing the control signal processing circuit; and
    a signal selector connected between the slow clock source of the control signal input circuit and a control signal selection unit of the control signal processing circuit, a first input signal of the signal selector having an electric potential of zero, whereas a second input signal is the slow clock signal from the slow clock source of the control signal input circuit, the signal selector being configured to be controlled by a signal selection control signal and when in the second power mode, the signal selection control signal controlling the signal selector circuit to select the first input signal with electric potential of zero to be fed to the control signal selection unit.

2. The electronic circuit according to claim 1, wherein the fast clock source is further configured to generate the fast clock signal when in the first power mode and not generate the fast clock signal when in the second power mode.

3. The electronic circuit according to claim 2, wherein the control signal processing circuit comprises a first control signal input for the fast clock signal and a second control signal input for the slow clock signal.

4. The electronic circuit according to claim 1, wherein the control signal processing circuit is a clock processing circuit comprising at least one of the following elements: a clock selection and synchronization unit and a clock signal generation unit.

5. The electronic circuit according to claim 1, wherein the control signal output circuit comprises a first switch connected between the control signal processing circuit and a central processing unit.

6. The electronic circuit according to claim 1, wherein the control signal output circuit comprises a second switch connected between the control signal processing circuit and at least one peripheral.

7. The electronic circuit according to claim 1, wherein the control signal processing bypass circuit comprises a bypass line and a first switch and a second switch for interrupting the bypass line.

8. A method of operating an electronic circuit comprising a control signal input circuit including a slow clock source configured to generate a slow clock signal and fast clock source configured to selectively generate a fast clock signal, a control signal output circuit, a control signal processing circuit configured to process at least one of the slow clock signal and the fast clock signal applied from the control signal input circuit, and to operate in at least one of a first power mode and a second power mode, the second power mode having a lower power consumption than the first power mode, a control signal processing bypass circuit configured to, when the control signal processing circuit is in the second power mode, provide a bypass connection for conveying the slow clock signal, from the control signal input circuit to the control signal output circuit, and a signal selector connected between the slow clock source of the control signal input circuit and a control signal selection unit of the control signal processing circuit, a first input signal of the signal selector having an electric potential of zero, whereas a second input signal is the slow clock signal from the slow clock source of the control signal input circuit, the signal selector being configured to be controlled by a signal selection control signal,
    the method comprising:
        receiving a request to enter the second power mode;

in response to receiving the request to enter the second power mode, conveying the slow clock signal, from the control signal input circuit to the control signal output circuit through the control signal processing bypass circuit, thereby bypassing the control signal processing circuit; and when in the second power mode, controlling, by the signal selection control signal, the signal selector to select the first input signal with electric potential of zero to be fed to the control signal selection unit.

9. The method according to claim 8, the method further comprising not generating the fast clock signal when in the second power mode.

10. The method according to claim 8, wherein the fast clock signal and the slow clock signal have different clocking frequencies.

11. The method according to claim 8, wherein the slow clock signal has clocking frequency between 1 kHz and 1 MHz.

* * * * *